United States Patent

Takagi

[19]

[11] Patent Number: 5,898,164
[45] Date of Patent: Apr. 27, 1999

[54] RECORDING MEDIUM PROCESSING DEVICE HAVING A VIBRATION ACTUATOR AND FOR USE IN AN AUTOMATIC DEVICE SUCH AS A PACHINKO MACHINE

[75] Inventor: Tadao Takagi, Yokohama, Japan

[73] Assignee: Nikon Corporation, Tokyo, Japan

[21] Appl. No.: 08/820,550

[22] Filed: Mar. 19, 1997

[30] Foreign Application Priority Data

Mar. 19, 1996 [JP] Japan .................................. 8-062372

[51] Int. Cl.$^6$ ............................ G06K 7/10; G06K 13/00; G06K 13/04; A63B 67/14
[52] U.S. Cl. ........................ 235/475; 235/454; 235/479; 235/380; 273/108; 273/121 B
[58] Field of Search .................... 235/475, 454, 235/479, 380; 273/108, 121 B

[56] References Cited

U.S. PATENT DOCUMENTS

| | | | |
|---|---|---|---|
| 5,163,034 | 11/1992 | Kitai et al. ............................. | 235/454 |
| 5,189,661 | 2/1993 | Honda et al. .......................... | 235/479 |
| 5,395,110 | 3/1995 | Yamazaki et al. ..................... | 278/108 |
| 5,517,010 | 5/1996 | Takemoto et al. ..................... | 235/380 |
| 5,700,997 | 12/1997 | Takemoto et al. ..................... | 235/1 B |
| 5,725,210 | 3/1998 | Yamaguchi et al. ................... | 273/121 |

FOREIGN PATENT DOCUMENTS

| | | |
|---|---|---|
| 7-143771 | 6/1995 | Japan . |
| 7-236756 | 9/1995 | Japan . |

OTHER PUBLICATIONS

Piezoelectric Linear Motors for Application to Driving a Light Pick–Up Element, (Mr. Yoshiro Tomikawa et al., 5th Electromagnetic Force Related Dynamics Symposium, Collected Papers, Jun. 9–11, 1993, pp. 393–398) (with English translation).

Ultrasonic Motors, Theory and Applications, S. Ueha, Y. Tomikawa, M. Kurosawa, N. Nakamura, Clarendon Press, Oxford, 1993, all pages no month.

*Primary Examiner*—Donald Hajec
*Assistant Examiner*—Daniel St. Cyr

[57] ABSTRACT

A recording medium processing device which performs writing or readout of data with respect to a magnetic card. The recording medium processing device includes a conveying mechanism which conveys the magnetic card and the conveying mechanism has a vibration actuator which is the drive source of the conveying mechanism. The vibration actuator includes an elastic member and electromechanical converting elements located on the elastic member. Drive rollers are in compressive contact with the elastic member and drive the magnetic card between a first position of entry into an automatic device, such as a pachinko machine, automatic sales machine or automatic ticket machine, and a second position for writing or reading the data from the recording medium. The recording medium processing device also has an information processing mechanism to write the data onto or read the data from the recording medium when the recording medium is at the second position.

23 Claims, 5 Drawing Sheets

FIG. 3C
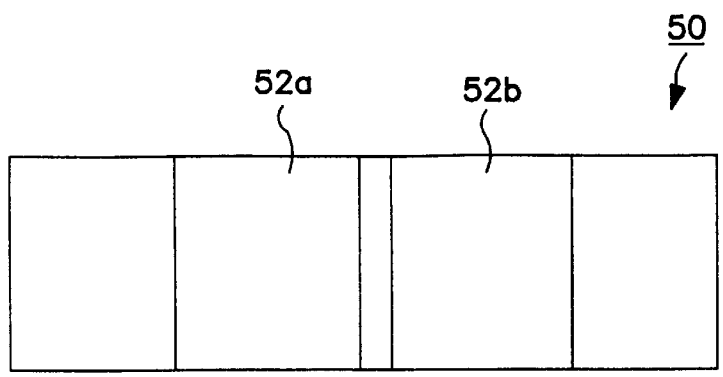
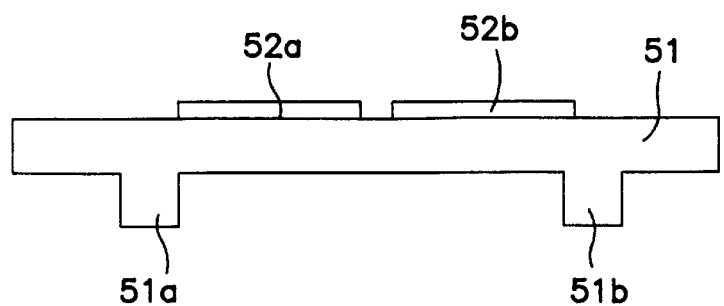
FIG. 3A
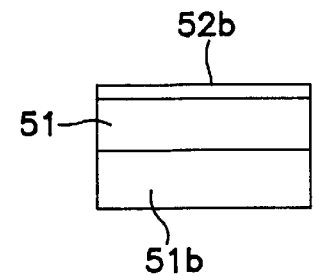
FIG. 3B

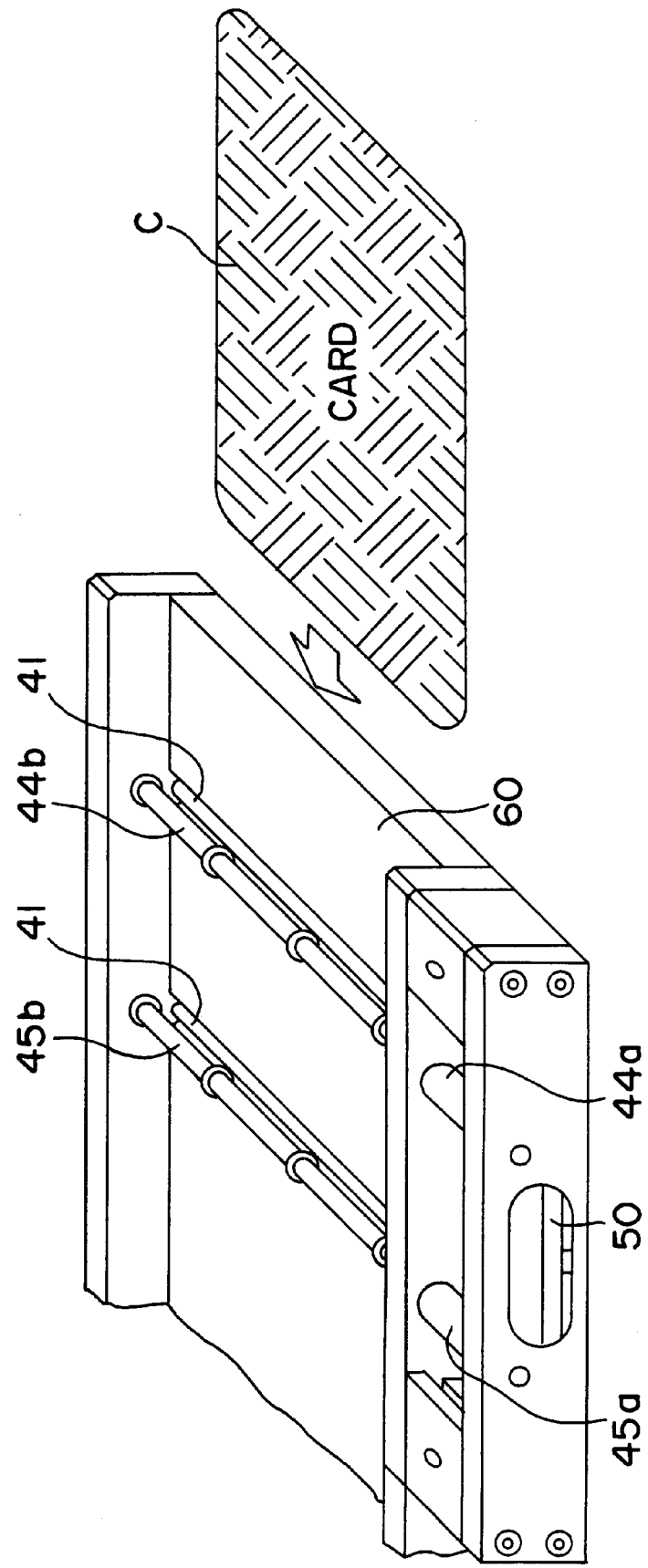

RECORDING MEDIUM PROCESSING DEVICE HAVING A VIBRATION ACTUATOR AND FOR USE IN AN AUTOMATIC DEVICE SUCH AS A PACHINKO MACHINE

CROSS REFERENCE TO RELATED APPLICATIONS

This application is based upon and claims priority from Japanese Patent Application No. 8-062372 filed Mar. 19, 1996, the contents of which are incorporated herein by reference.

BACKGROUND OF THE INVENTION

1. Field of the Invention

The present invention relates to a recording medium processing device which performs readout or writing of data with respect to a magnetic card or recording medium, and more particularly, relates to a recording medium processing device having a conveying mechanism which uses a vibration actuator as a drive source of the recording medium, and to a card type pachinko machine which uses a recording medium processing device of this kind.

2. Description of the Related Art

In a known type of recording medium processing device, for a magnetic card or other sheet form recording medium, a conveying mechanism is included to convey the recording medium to a recording position, readout position or other predetermined position for the purpose of recording data onto or reading data from the recording medium.

The conveying mechanism, generally, uses a direct current motor or other type of electromagnetic motor as a drive source. The driving force of the electromagnetic motor, which is applied to a speed reduction mechanism, conveys the recording medium at a predetermined conveying speed.

In recent years, prepaid cards have been used as a recording medium for automatic sales machines, automatic ticket reading machines or pachinko machines, and recording medium devices to process this recording medium have been introduced into these automatic sales machines, automatic ticket reading machines, or card type pachinko machines.

For example, in Japanese Laid-Open Patent Publication No. 7-236756, a card type pachinko machine is disclosed which is equipped with a recording medium processing device with magnetic cards as the subject.

However, in each of the conventional automatic sales machines, automatic ticket reading machines, and card type pachinko machine, etc., because various mechanisms other than the recording medium processing device are located in the interior thereof, to avoid an increase in the size of the whole device, it is necessary to make each device located in the interior smaller. For this purpose, it is also necessary to make the recording medium processing device smaller.

Because the conventional recording medium processing devices use an electromagnetic motor as the drive source of the conveying mechanism, such that the electromagnetic motor obtains its driving force by using a magnetic action, there is a risk that surrounding devices or interior devices are affected by a magnetic field of the motor. The conventional recording medium processing device usually has an internal signal processing circuit to write or read out data of the recording medium. Anomalies arise in the signal processing circuit due to the effect of the magnetic field, and erroneous operation occurs.

In the case that the recording medium is a magnetic card, writing and readout operations which are performed magnetically, are easily affected by the electromagnetic motor. As a result, so that effects are not received from the magnetic field, it is necessary to dispose magnetic shielding or similar means between the electromagnetic motor (drive source) of the conveying mechanism and an information processing mechanism which performs the reading and writing operations, and for this reason there is a problem that the internal constitution of the recording medium processing device becomes complicated.

SUMMARY OF THE INVENTION

Accordingly, it is an object of the present invention to provide a recording medium processing device which is unaffected by a drive source of a conveying mechanism for a recording medium.

It is another object of the present invention to provide a recording medium processing device which is compact.

Additional objects and advantages of the invention will be set forth in part in the description which follows, and, in part, will be obvious from the description, or may be learned by practice of the invention.

Objects of the present invention are achieved by providing a recording medium processing device having a conveying mechanism which conveys a recording medium, and an information processing mechanism which performs readout and/or writing of data with respect to the recording medium, wherein the conveying mechanism uses a vibration actuator as a drive source. The vibration actuator contains a vibration element equipped with an elastic member and an electromechanical converting element formed on the elastic member, and a relative motion member is in compressive contact with the elastic member. The relative motion member may be a roller, and the recording medium is conveyed via the roller.

A recording medium processing device having a vibration actuator which conveys a prepaid ball card and an information processing mechanism, for reading out and/or writing the data of the recording medium, may be used in a card type pachinko machine which uses a prepaid ball card having a recording unit on which data is recorded.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIGS. 3A, 3B, and 3C are a front view, a side view, and a plan view, respectively, of a vibration actuator as a drive source of a conveying mechanism for driving a recording medium in the magnetic card processing device.

FIG. 4 is a schematic oblique diagram showing the constitution of a drive unit peripheral of the conveying mechanism.

DESCRIPTION OF THE PREFERRED EMBODIMENTS

Figure 1:
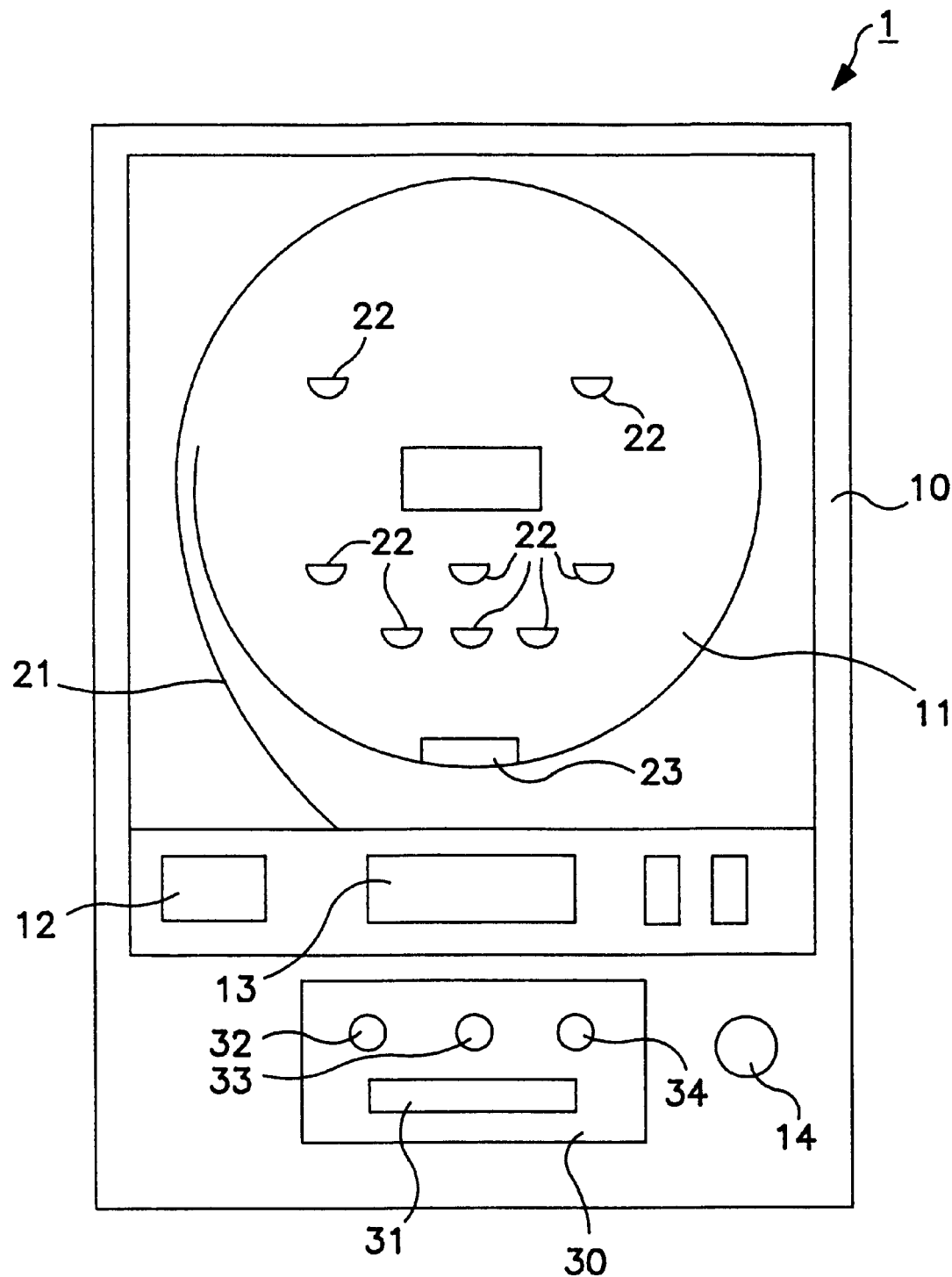
FIG. 1 is a schematic front view showing an external appearance of a card type pachinko machine according to an embodiment of the present invention.

A preferred embodiment of the present invention is described hereinbelow with reference to the drawings, wherein like reference numerals refer to like elements throughout. The type of vibration actuator hereinafter described is preferably an ultrasonic actuator which uses the oscillation region of an ultrasonic wave.

Further, the recording medium processing device of the embodiment of the present invention is applied to a pachinko machine.

FIG. 1 is a schematic front view showing an external appearance of a card type pachinko machine. The card type pachinko machine 1 has a predetermined number of pachinko balls placed within it so as to be able to supply a necessary number of pachinko balls. The prepaid number of pachinko balls corresponding to an amount of money (termed hereinbelow the "prepaid number of balls"), the prepaid amount of money, an ID number to prevent illegality, and other data are written by a card issuing machine on a magnetic card C which is a recording medium (see FIG. 4).

As shown in FIG. 1, the card type pachinko machine 1 includes a frame 10, a playing board 11, a display unit 12 which displays the data recorded on the magnetic card C, a waiting ball enclosure 13, and a magnetic card processing device 30.

The playing board 11 has a rail 21 which guides the pachinko balls, plural "safe" holes 22, and an "out" hole 23 disposed thereon. Pachinko balls are launched by means of a pachinko ball launching device (not shown in the drawing), and are guided by the rail 21 within the playing board 11. An actuating handle 14 is used to drive the pachinko ball launching device.

The magnetic card processing device 30, in the same plane as the frame 10, has a magnetic card insertion aperture 31, a conversion switch 32 which converts the prepaid amount of money into the number of prepaid pachinko balls, an end switch 33 which ends the game, and an ejection switch which ejects the magnetic card C housed within the magnetic card processing device 30.

Figure 2:
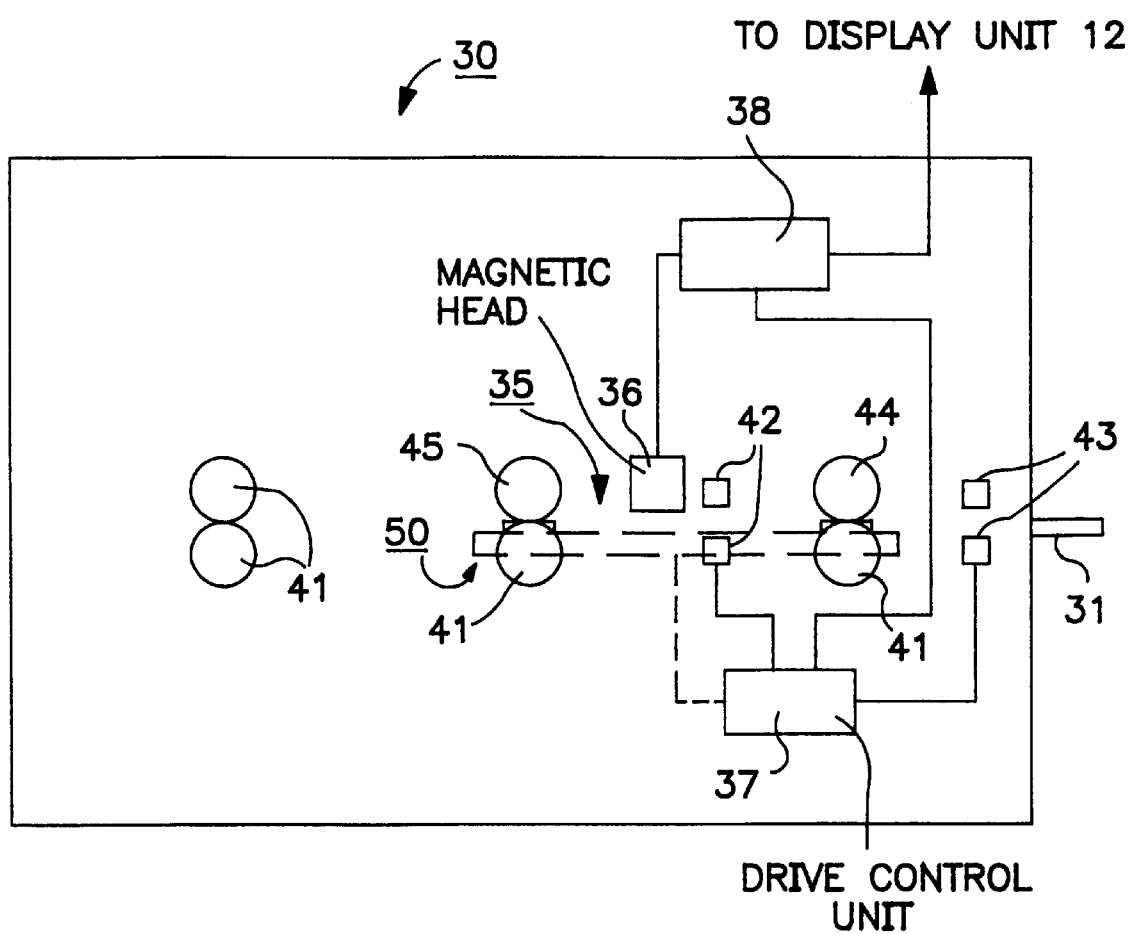
FIG. 2 is a schematic cross sectional diagram showing an interior portion of a magnetic card processing device located in the card type pachinko machine of FIG. 1.

FIG. 2 is a schematic cross sectional diagram showing the constitution of the interior of the magnetic card processing device 30. The magnetic card processing device 30 includes a conveying mechanism 35 which conveys the magnetic card C, a magnetic head 36 which performs writing and reading out of data with respect to the magnetic card C, a drive control unit 37, and a signal processing circuit 38. The signal processing unit 38 plays back the data which have been recorded on the magnetic card C via the magnetic head 36. Moreover, the desired data is recorded on the magnetic card C via the magnetic head 36.

The conveying mechanism 35 includes a vibration actuator (hereinafter referred to as an "ultrasonic actuator") 50 as a drive source, drive rollers 44, 45 which are rotationally driven by the ultrasonic actuator 50, plural feed rollers 41 located along the conveyance path of the magnetic card C, a first position detection sensor 42 which detects the writing and readout position of the magnetic card C, and a second position detection sensor 43 which detects the insertion and ejection positions of the magnetic card C.

The drive control unit 37 outputs drive signals to the ultrasonic actuator 50, to control the ultrasonic actuator 50. Moreover, the drive control unit 37 outputs data relating to the conveyance speed of the magnetic card C to the signal processing circuit 38. Receiving this conveyance speed data, the signal processing unit 38 performs writing and readout of data onto the magnetic card C using the magnetic head 36 and in accordance with the conveyance speed of the magnetic card C.

FIG. 3A is a front view, FIG. 3B is a side view, and FIG. 3C is a plan view of the ultrasonic actuator 50. The ultrasonic actuator 50 is a linear driving type of ultrasonic actuator which obtains a driving force using longitudinal vibrations and bending vibrations. This type of ultrasonic actuator, for example, the "longitudinal L1–B4 bending mode, flat plate mode" actuator is known and disclosed at page 394 of the reference "222 Piezoelectric Linear Motors for Application to Driving a Light Pick-up Element," Tomikawa et al., p. 393–398, Jun. 9–11, 1993 of the lecture papers of the Fifth Magnetic Force Related Dynamics Symposium, Hitachi, Japan.

As shown in FIGS. 3A through 3C, the ultrasonic actuator 50 includes an elastic member 51 of a rectangular plate form, and two piezoelectric elements 52a, 52b, which are adhered to one surface of the elastic member 51. The piezoelectric elements 52a, 52b have the function of converting electrical energy into mechanical displacements (mechanical energy), and by the respective inputs of predetermined drive signals which have been output from the drive control unit 37 (FIG. 2), cause the occurrence of longitudinal vibrations and bending vibrations in the elastic member 51.

The elastic member 51 has two driving force output units 51a, 51b which are formed as protrusions on the opposite surface of the piezoelectric elements 52a, 52b (the surface on which the piezoelectric elements 52a, 52b are not adhered). These driving force output units 51a, 51b are formed in positions which become antinodes of the bending vibration occurring in the elastic member 51, and transmit a driving force by means of the predetermined compressive contact with the drive rollers 44, 45 which are relative motion members.

The elastic member 51, by means of the input of the drive signals, undergoes a first order mode longitudinal vibration and a fourth order mode bending vibration, displacing the tips of the driving force output members 51a, 51b synchronously in an elliptic form, and elliptic motion occurs.

Because the elastic member 51 is fixed, the drive rollers 44, 45, which are in compressive contact with the driving force output members 51a, 51b, are rotationally driven by the elliptic motion.

The driving direction of the ultrasonic actuator 50 can be changed over by the drive signals impressed on the piezoelectric elements 52a, 52b. Moreover, the mechanism by which the elastic member 51 and the drive rollers 44, 45 are caused to be in compressive contact with each other is described as follows.

Figures 5B, 5C, 5D:
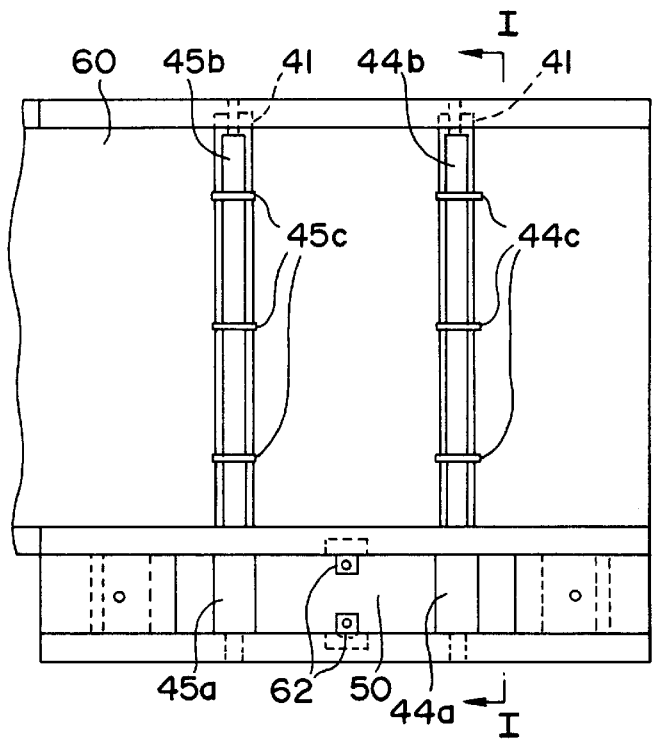
FIGS. 5A through 5D are a front view, a side view, a top view, and a cross sectional view seen along the lines I—I of FIG. 5C, respectively, of the drive unit peripheral shown in FIG. 4.
Figure 5A:
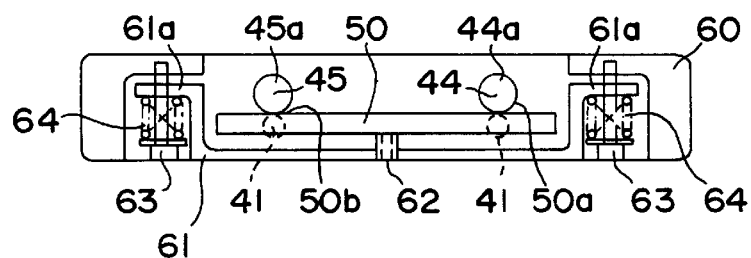

FIG. 4 is a schematic oblique diagram showing the constitution of a drive unit peripheral of the conveying mechanism 35. FIG. 5A is a front view, FIG. 5B is a side view, FIG. 5C is a top view and FIG. 5D is a cross section seen along the line I—I of FIG. 5C, of the drive unit peripheral of FIG. 4.

The elastic member 51 of the ultrasonic actuator 50 is supported by two support pins 62 at a fixed position with respect to a driving element fixed member 61, which has been fixed to the base 60 of the conveying mechanism 35. The driving element fixed member 61, as shown in FIG. 5A, has a concave shape having a plate shaped edge portion 61a in a cross section along the driving direction of the magnetic card C. The surface of the elastic member 51 on which the driving force output members 51a, 51b are formed faces the magnetic card C, and the elastic member 51 is accommodated in the interior of the concave shape of the plate shaped edge portion 61a. Then, the elastic member 51 is fixed to the driving unit fixed member 61 by the two support pins 62. The two support pins 62 are located so as to support the elastic member 51 in the central portion of the longitudinal direction which becomes the common node of the longitudinal vibration and the bending vibration which arise in the elastic member 51.

The driving element fixed member 61, as shown in FIG. 5A, at the edge portions 61a formed in the front and rear positions of the elastic member 51, is fixed to the base 60 by two screws 63. The screws 63 are fastened in the direction from the surface of the elastic member 51 to which the piezoelectric elements 52 are adhered to the surface formed by the driving force output members 51a, 51b.

Coil springs 64 are located between the heads of the screws 63 and the driving element fixed member 61, and cause compressive contact between the driving force output members 51a, 51b and the drive rollers 44, 45. The drive rollers 44, 45, as mentioned later, are together rotatably supported by the base 60. Because of this, the contact pressure of the driving force output members 51a, 51b and the drive rollers 44, 45 can be adjusted by adjusting the tightening of the screws 63.

As shown in FIG. 5A, the compression mechanism of the ultrasonic actuator 50 includes the screws 63 and the coil springs 64. Because the compression mechanism is located on the lower side of the edge portions 61a, the height direction of the driving portion peripheral of the conveying mechanism 35 can be kept limited to a small dimension.

The drive rollers 44, 45 are rotatably supported at three places on the base 60. The drive rollers 44, 45 have large diameter portions 44a, 45a which are in contact with the driving force output members 51a, 51b of the ultrasonic actuator 50, and small diameter portions 44b, 45b having annular rubber members 44c, 45c which are positioned to be in contact with the magnetic card C.

On the small diameter portions 44b, 45b, annular rubber members 44c, 45c are formed in the contact portions with the magnetic card C, and are respectively located in three distinct places. Along the conveyance path of the magnetic card C, the feed rollers 41 are located facing the small diameter rollers 44b, 45b, and are respectively rotatably supported at two places on the base 60.

The operation of a card type pachinko machine according to the embodiment of the present invention is described below, with a focus on the magnetic card processing device.

When the magnetic card C is inserted into the magnetic card insertion aperture 31, the second position sensor 43 detects that the magnetic card C has been inserted, and its detection signal is output to the drive control unit 37. The drive control unit 37, receiving the detection signal, outputs drive signals to the piezoelectric elements 52a, 52b of the ultrasonic actuator 50. In response to the drive signals output to the piezoelectric elements 52a, 52b, the elastic member 51 generates first order longitudinal vibrations and fourth order bending vibrations, and the tips of the driving force output members 51a, 51b exhibit elliptic motion.

As a result, the drive rollers 44, 45, which contact the tips of the driving force output members 51a, 51b under a predetermined pressure, are rotationally driven, and the magnetic card C which is inserted between the drive rollers 44, 45 and the feed rollers 41 is conveyed in the direction of the magnetic head 36. When the first position detector 42 detects that the magnetic card C has reached the data readout and writing position, the thus output detection signal is sent to the drive control unit 37.

Subsequently, the magnetic head 36 reads out the data recorded on the recording portion (not shown in the drawing) of the magnetic card C and outputs the obtained data to the signal processing circuit 38. The signal processing circuit replays the data regarding the prepaid number of balls, prepaid amount of money, and ID number which were recorded on the magnetic card C.

When the first position sensor 42 detects the rear end of the magnetic card C, its detection signal is output to the drive control unit 37. The drive control unit 37 stops the drive of the ultrasonic actuator 50 upon receiving the detection signal indicative of the rear end of the magnetic card C reaching the first position detection sensor 42. The located position of the first position sensor and the second position sensor may be suitably set, taking into account the length or the magnetic card C, the position of the magnetic head 36 and of the drive rollers 44, 45. Further, the number of position sensors may be increased, if necessary.

When the magnetic card C is conveyed, the drive control unit 37 impresses drive signals on the piezoelectric elements 52a, 52b so as to reverse the drive direction of the ultrasonic actuator 50 at the time of ejection. The rollers 44, 45 are thereby rotated in the opposite direction to that at the time of insertion, and the magnetic card C is ejected from the magnetic card insertion aperture 31.

In this manner, because a vibration actuator, such as the ultrasonic actuator, has been used as the drive source of the conveying mechanism of the magnetic card C in a card type pachinko mechanism, the complicated mechanism of the prior art, such as a speed reduction mechanism, becomes unnecessary, and the structure of the drive unit peripherals can be simplified and reduced in size. Moreover, the peripheral electronic circuits and the like are not affected by magnetic fields, and the risk of erroneous operation due to magnetic fields is reduced.

There is no limitation to the above-described embodiment of the present invention. Various alterations and modifications are possible, and these are equally within the scope of the present invention. For example, the embodiment has been described as a case in which the recording medium processing device, which includes a vibration actuator, is applied to a pachinko machine, but the present invention is not limited to use in a pachinko machine, and can also be applied to automatic ticket reading machines with a ticket as the recording medium.

Additionally, in the above-described embodiment of the present invention, a magnetic card is used as the recording medium, but the recording medium of the present invention is not limited to one which uses magnetism, and optical cards and related optical recording media may be used. In this case, an optical head may be substituted for the magnetic head.

Thus, although a preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A device which performs at least one of recording data to a recording medium and retrieving data from a recording medium, comprising:

a conveying mechanism disposed in the device and conveying the recording medium from a first position of the device to a second position of the device, to thereby perform at least one of writing data to the recording medium and reading data from the recording medium, said conveying mechanism including a vibration actuator to drive the recording medium, wherein said vibration actuator includes
  a vibration element having an electromechanical converting element, and
  a relative motion member which is in compressive contact with the vibration element, and which contacts the recording medium when the recording medium is placed in the device; and
an information processing mechanism to perform information processing for the at least one of the writing to and reading from the recording medium.

2. The device as claimed in claim 1, wherein said relative motion member is formed by rollers which convey the recording medium.

3. The device as claimed in claim 1, wherein the device is a pachinko machine which receives the recording medium in a card format, the recording medium storing information regarding a number of prepaid balls for use in the pachinko machine.

4. The device as claimed in claim 1, wherein the device is an automatic sales machine which receives the recording medium in a card format.

5. The device as claimed in claim 1, wherein the device is an automatic ticket machine which receives the recording medium in a card format.

6. The device as claimed in claim 1, wherein said vibration actuator further includes:
  an elastic member having
    a first surface where driving force output portions are formed, and
    a second surface where said electromechanical converting element is formed, said electromechanical converting element inducing longitudinal vibration and bending vibration in said elastic member, thereby causing elliptical motion of said driving force output portions; and
  said conveying mechanism further includes
    a first sensor to determine whether the recording medium is placed in the first position, and
    drive rollers in compressive contact with said driving force output portions;
  wherein said drive force output portions move in the elliptical motion to rotate said drive rollers in response to said first sensor determining that the recording medium is placed in the first position, thereby moving the recording medium from the first position to the second position.

7. The device as claimed in claim 6, wherein the device is a pachinko machine which receives the recording medium in a card format, the recording medium storing information regarding a number of prepaid balls for use in the pachinko machine.

8. The device as claimed in claim 6, wherein said conveying mechanism further comprises:
  a base fixedly mounted to the device;
  a driving element fixed member having a concave shape, which receives said vibration actuator within the concave shape;
  a support device, fixed to said driving element fixed member, to support said elastic member at a common node of the longitudinal and bending vibrations; and
  a biasing element, connected at edge portions of the concave shape of said driving element fixed member, to bias said driving element fixed member toward said driving rollers, thereby biasing said driving force output portions in the compressive contact with said drive rollers.

9. The device as claimed in claim 8, wherein said biasing element comprises:
  screws, having heads, fastened to said base and said edge portions of said driving element fixed member in a direction from the second surface to the first surface of said elastic member; and
  springs respectively located between the heads of said screws and said edge portions.

10. The device as claimed in claim 6, further comprising a second sensor to determine when the recording medium has reached the second position, wherein said vibration actuator stops moving in response to said second sensor determining that the recording medium has reached the second position.

11. The device as claimed in claim 6, wherein said drive rollers have a cylindrical shape, and have a first portion with a first diameter to contact said respective driving force output portions, and a second portion with a second diameter less than the first diameter, wherein said second portion has cylindrical contact members formed at a periphery, to contact the recording medium as the recording medium moves along a path of motion between the first position and the second position.

12. The device as claimed in claim 6, wherein said electromechanical converting elements drive said driving force output portions in a first direction of the elliptical motion to rotate the drive rollers in a first direction for moving the recording medium from the first position to the second position, and said electromechanical converting elements drive said driving force output portions in a second direction of the elliptical motion to rotate the drive rollers in a second direction for moving the recording medium from the second position to the first position.

13. The device as claimed in claim 6, wherein said conveying mechanism further comprises feed rollers, formed along a path of motion of the recording medium between the first position and the second position, to rotate as a result of the drive rollers moving the recording medium along the path of motion, thereby guiding the recording medium.

14. The device as claimed in claim 13, wherein said conveying mechanism further comprises:
  a base fixedly mounted to the device;
  a driving element fixed member having a concave shape, which receives said vibration actuator within the concave shape;
  a support device, fixed to said driving element fixed member, to support said elastic member at a common node of the longitudinal and bending vibrations; and
  a biasing element, connected at ends of the concave shape of said driving element fixed member, to bias said driving element fixed member toward said driving rollers, thereby biasing said driving force output portions in the compressive contact with said drive rollers.

15. The device as claimed in claim 14, wherein said biasing element comprises:
  screws, having heads, fastened to said base and said edge portions of said driving element fixed member in a direction from the second surface to the first surface of said elastic member; and
  springs respectively located between the heads of said screws and said edge portions.

16. The device as claimed in claim 1, wherein said information processing mechanism reads from and records magnetic information to the recording medium.

17. The device as claimed in claim 1, wherein said information processing mechanism reads from and records optical information to the recording medium.

18. A pachinko machine which performs at least one of recording data to or retrieving data from a recording medium, comprising:

a conveying mechanism to convey the recording medium from a first position of insertion into the device to a second position for at least one of writing the data to or reading the data from the recording medium, said conveying mechanism including a vibration actuator to drive the recording medium; and an information processing mechanism to perform the writing to and reading from the recording medium, wherein said information processing mechanism reads the data from the recording medium indicative of a prepaid number of pachinko balls to be played and an identification number of a user, and writes updated data indicative of a remaining number of prepaid balls to the recording medium after a number of balls have been played.

19. A device for at least one of recording data to or retrieving data from a recording medium, comprising:

means for conveying the recording medium from a first position of the device to a second position of the device, to thereby perform at least one of writing data to or reading data from the recording medium, said conveying means including a vibration actuator to drive the recording medium, wherein said vibration actuator comprises:
   a vibration element having an electromechanical converting element, and
   a relative motion member which is in compressive contact with the vibration element, and which contacts the recording medium when the recording medium is placed in the recording medium processing device; and means for performing the at least one of writing or reading of data with respect to the recording medium.

20. A device to perform recording data to or retrieving data from a recording medium, comprising:

means for conveying the recording medium from a first position of insertion into the device to a second position for writing the data to and/or reading the data from the recording medium, said conveying means including an ultrasonic vibration actuator as a driving source to drive the recording medium; and means for performing the writing to and reading from the recording medium.

21. A card processing device, comprising:

a plurality of rolling elements to transport a card from a first position to a second position;

an ultrasonic vibration actuator as a driving source to drive at least one of said plurality of rolling elements;

first and second card position sensors, wherein said second card position sensor detects insertion of the card into the card processing device and said first position sensor detects a position for reading data from or writing data to the card; and an information processing mechanism to perform the reading or the writing of data with respect to the card.

22. The card processing device according to claim 21, wherein said ultrasonic vibration actuator further comprises:
   an elastic member, and
   an electromechanical converting element disposed on said elastic member; and
   a relative motion member which is in compressive contact with said elastic member, and which contacts the recording medium when the recording medium is placed in the recording medium processing device.

23. The card processing device according to claim 22, wherein the card is a magnetic card and said information processing mechanism includes a magnetic head to read or write data with respect to the card.

* * * * *